United States Patent [19]
Seki et al.

[11] Patent Number: 5,634,645
[45] Date of Patent: Jun. 3, 1997

[54] SHEET-LIKE GASKET WITH OVERLAPPED PERIPHERAL PORTIONS

[75] Inventors: Masanori Seki, Ayabe; Takahisa Ueda; Akira Hashimoto, both of Sanda; Toshiyasu Tanimura, Fukuchiyama, all of Japan

[73] Assignee: Nippon Pillar Packing Co., Ltd., Japan

[21] Appl. No.: 464,867

[22] PCT Filed: May 30, 1994

[86] PCT No.: PCT/JP94/00870

§ 371 Date: Jul. 18, 1995

§ 102(e) Date: Jul. 18, 1995

[87] PCT Pub. No.: WO95/20732

PCT Pub. Date: Mar. 8, 1995

[30] Foreign Application Priority Data

Jan. 31, 1994 [JP] Japan ................... 6-009696

[51] Int. Cl.$^6$ ........................... F16J 15/10
[52] U.S. Cl. ........................ 277/227; 277/198
[58] Field of Search ............... 277/192, 198, 277/199, 180, 220, 221, 227, 233

[56] References Cited

U.S. PATENT DOCUMENTS

| | | | |
|---|---|---|---|
| 456,243 | 7/1891 | Fromm | 277/198 |
| 595,867 | 12/1897 | Watson et al. | 277/220 |
| 3,231,289 | 1/1966 | Carrell | 277/199 |
| 3,580,765 | 5/1971 | Grove | 277/221 |
| 4,293,135 | 10/1981 | Wallace | 277/199 |
| 4,535,996 | 8/1985 | Cardis et al. | 277/180 |
| 4,572,522 | 2/1986 | Smagatz | 277/235 B |
| 5,222,744 | 6/1993 | Dennys | 277/198 |
| 5,236,203 | 8/1993 | Uchida et al. | 277/192 |
| 5,413,359 | 5/1995 | Latty | 277/198 |

FOREIGN PATENT DOCUMENTS

| | | |
|---|---|---|
| 61-118548 | 6/1986 | Japan. |
| 3-505596 | 12/1991 | Japan. |

OTHER PUBLICATIONS

Machine Design: "Seals", 3rd. ed.; pp. 74–81.

*Primary Examiner*—Scott Cummings
*Attorney, Agent, or Firm*—Jones, Tullar & Cooper, P.C.

[57] ABSTRACT

A sheet-like gasket formed of a material having a layered internal structure, for suppressing or preventing leakage penetration, and to attain very high sealing properties together with contact-surface leakage reduction. The sheet-like gasket has two base members each including spaced apart high-density faces and having an outer end portion 1A1 and an inner end portion 1B1 of sheet-like base members 1A and 1B which are adjacent in an inner and outer relationship which are partially overlapped. The whole gasket including the overlap portion is formed by pressurization so as to have a substantially uniform thickness. As a result, double high-density layers and are formed in the overlap portion where the base members are bonded.

11 Claims, 14 Drawing Sheets

Fig. 21

PROPERTY COMPARISON AMONG VARIOUS MATERIALS

| PROPERTIES<br>MATERIALS | MODULUS | STRESS RELAXATION | AIRTIGHTNESS | HEAT RESISTANCE | CONTAMINATION OF FLUID | ECONOMIC ADVANTAGE |
|---|---|---|---|---|---|---|
| EXPANDED GRAPHITE | ○ | ◎ | ◎ | ◎ | △ | △ |
| POROUS PTFE | ◎ | △ | ○ | △ | ◎ | × |
| BEATER SHEET | △ | ○ | △ | ○ | ○ | ○ |
| JOINT SHEET | △ | ○ | △ | ○ | ○ | ○ |
| PAPER SHEET | ○ | ◎ | △ | ◎ | ○ | ◎ |

Fig.22

| | BREAKING STRENGTH | HEAT RESISTANCE | LEAKAGE AMOUNT |
|---|---|---|---|
| FIRST EMBODIMENT | ◎ | ◎ | 0.04 |
| SECOND EMBODIMENT | ◎ | ◎ | 0.08 |
| THIRD EMBODIMENT | △ | ◎ | 0.02 |
| FOURTH EMBODIMENT | ○ | △ | 0.01 OR LESS |
| FIFTH EMBODIMENT | ◎ | ◎ | 0.08 |
| SIXTH EMBODIMENT | ◎ | ◎ | 0.08 |
| SEVENTH EMBODIMENT | ○ | △ | 0.01 OR LESS |
| EIGHTH EMBODIMENT | ○ | ○ | 0.01 OR LESS |
| PRIOR ART EXAMPLE (A) | ◎ | ◎ | 1.00 |
| PRIOR ART EXAMPLE (B) | ◎ | ◎ | 0.50 |
| PRIOR ART EXAMPLE (C) | ○ | ◎ | 0.75 |
| PRIOR ART EXAMPLE (D) | ○ | ◎ | 0.75 |
| PRIOR ART EXAMPLE (E) | ○ | ◎ | 0.15 |

5,634,645

SHEET-LIKE GASKET WITH OVERLAPPED PERIPHERAL PORTIONS

BACKGROUND OF THE INVENTION

1. Technical Field

The present invention relates to a sheet-like gasket which is useful for sealing a flange connection portion of a pipe joint, a passage connection portion of a fluid apparatus, or the like, and more particularly to a sheet-like gasket formed of a material having a layered internal structure such as expanded graphite or porous polytetrafluoroethylene (PTFE).

2. Prior Art

Sheet-like gaskets of such types which are conventionally known include those having the following structures:

(A) A gasket which, as shown in FIG. 24, is produced by forming a material having a layered internal structure such as expanded graphite superior in heat resistance, airtightness and stress relaxation property, or porous PTFE superior in contamination preventing property for fluid, into a sheet-like shape by pressurization, and then stamping the sheet-like material into an annular shape, so as to form a sheet-like base member 10 having a predetermined shape.

(B) A gasket such as a print gasket in which, as shown in FIG. 25, local protrusions 11 are formed on both front and back faces 10a and 10a, i.e., on tightening faces of a sheet-like base member 10 having a predetermined shape made of expanded graphite, porous PTFE, or the like, so that a high face pressure is locally applied to the contact surface.

(C) A gasket in which, as shown in FIG. 26, inside and outside portions of a sheet-like base member 10 having a predetermined shape made of expanded graphite, porous PTFE, or the like are compressed from both front and back faces for forming recesses, so that a high-density layer 13 is formed between the recess portions 12 and 12 on the front and back faces.

(D) A gasket in which, as shown in FIG. 27, an inner circumferential face portion of a sheet-like base member 10 having a predetermined shape made of expanded graphite, porous PTFE, or the like is compressed by using a mold, etc., so as to form a high-density layer 13. In FIG. 27, the high-density layer 13 is formed only on the inner circumferential face portion of the sheet-like base member 10. Alternatively, the high-density layer 13 may be formed only on an outer circumferential face portion, or on both inner and outer circumferential face portions.

(E) A gasket in which, as shown in FIG. 28, on an outer or inner end portion of a sheet-like base member 10 having a predetermined shape made of expanded graphite, porous PTFE, or the like, a local sheet base member 14 made of the same material as that of the sheet-like base member 10 is overlapped, and then pressurized so that the thickness of the whole structure is uniform. In FIG. 28, the local sheet base member 14 is overlapped only on the outer end portion of the sheet-like base member 10. Alternatively, the local sheet base member 14 may be overlapped only on the inner end portion.

(F) A gasket produced by, as shown in FIG. 29, coating both front and back faces of a sheet-like base member 10 having a predetermined shape made of expanded graphite, porous PTFE, or the like with coating members 15 and 15 made of PTFE or the like, or by, as shown in FIG. 30, coating the entire face of the sheet-like base member 10 with a coating member 15 made of PTFE or the like.

(G) A gasket by, as shown in FIG. 31, covering and enclosing an inner end portion and an inner circumferential face portion of a sheet-like base member 10 having a predetermined shape made of expanded graphite, porous PTFE, or the like with a covering member 16 made of a metal, PTFE (which is not porous), or the like.

In general, in a sheet-like gasket in which a sheet-like base member 10 is formed of a material having a layered internal structure such as expanded graphite or porous PTFE, as is apparent from an enlarged cross-sectional structure shown in FIG. 32, both front and back face portions 10a and 10a of the sheet-like base member 10 are in a high-density and high-alignment (high alignment: a state in which alignment in one direction is attained, so that, for example for expanded graphite, flaky expanded graphite particles are tidily arranged in a stacked manner) state. Accordingly, as indicated by b in the figure, leakage from the inside to the front and back face portions 10a and 10a hardly occurs, but, as indicated by a in the figure, penetration leakage via the internal layer to the outside tends to easily occur.

With the aforementioned view points, the above-listed conventional sheet-like gaskets will be individually studied. In the structures of (A) and (B), leakage from the contact surface, i.e., contact-surface leakage can be suppressed or prevented by tightening at a high face pressure, but penetration leakage such as that indicated by a in FIG. 32 cannot be prevented from occurring. In the structures of (C) and (D), penetration leakage is reduced due to the presence of the high-density layer 13, but contact-surface leakage easily occurs. Furthermore, in the structure of (E), both contact-surface leakage and penetration leakage can be reduced because the passage for penetration leakage is narrow. The narrow passage, however, does not mean that the passage for penetration leakage is cut off. Thus, a small amount of penetration leakage cannot be prevented from occurring, so that high sealing properties cannot be attained in any way.

In the structure of (F), particularly in the structure wherein the entire face is coated, the density of the coating member portions on the front and back faces is increased as the degree of the tightening is advanced, so that contact-surface leakage can be surely prevented. However, the density of the coating member portions on the inner and outer circumferential faces is not increased, so that penetration leakage cannot be prevented from occurring. In the structure of (G), it is desired to use a metal or hard non-porous PTFE as the covering member 16 in order to prevent penetration leakage. However, in some cases, for example, in the case where the tightening face pressure cannot be made higher, in the case where a joint flange is soft, or in the case where the gasket is used at a high temperature, a hard material cannot be used depending on the circumstances in which leakage is to be prevented. In such cases, it is necessary to use a covering member 16 made of a soft material having heat resistance and corrosion resistance, so that penetration leakage inevitably occurs.

SUMMARY OF THE INVENTION

The present invention has been conducted in view of the above-described circumstances. It is an object of the invention to provide a sheet-like gasket in which contact-surface leakage and penetration leakage via an internal layer can be greatly decreased, so that very high sealing properties can be attained.

It is another object of the invention to concurrently attain, in addition to very high sealing properties, a plurality of properties which are contrary to each other and cannot be obtained by using a single material, such as contamination of fluid, heat resistance, adaptability of contact surfaces, and stress relaxation property.

In order to achieve the above-mentioned objects, the sheet-like gasket according to the invention is a sheet-like gasket formed of a material having a layered internal structure, wherein an outer end portion and an inner end portion of sheet-like base members which are adjacent in an inner and outer relationship among a plurality of divided sheet-like base members having an inner and outer relationship are partially overlapped, and the gasket as a whole including the overlap portion is formed by pressurization to have a substantially uniform thickness.

According to the invention, an outer end portion and an inner end portion of the sheet-like base members which are adjacent in the inner and outer relationship are partially overlapped. The whole gasket including the overlap portion is formed by pressurization so as to have a substantially uniform thickness. As a result, double high-density layers in the thickness direction thereof are partially formed in a direction crossing the overlap portion of the sheet-like base members. Due to the presence of the double high-density layers, penetration leakage via an internal layer of the sheet-like base member to the outside thereof can be cut off. Even if the penetration leakage partly reaches the front and back face portions of the sheet-like base member through the high-density layer in the sheet-like base member and through a small gap formed between the high-density layer in the outer sheet-like base member, such a small amount of leakage can be cut off in the front and back face portions because the front and back face portions are continuous in a high-density and high-alignment state. In addition, the front and back face portions of the whole gasket are in the high-density and high-alignment state over an entire area in the inward and outward directions, and have a structure which can prevent penetration leakage from occurring, so that it is possible to attain very high sealing properties as a whole.

In the sheet-like gasket having the above-mentioned configuration, the plurality of sheet-like base members which are adjacent in the inner and outer relationship may be provided with a continuous single-piece reinforcing member in the inward and outward directions.

With such a configuration, slight leakage may occur from the contact surface of the reinforcing member, but the breaking strength against an internal pressure can be reinforced, so that the gasket can be suitably used under high-pressure conditions.

Preferably, an impermeable layer may be formed on the overlap portion, or in the overlap portion, the sheet-like base members which are adjacent in the inner and outer relationship are bonded to each other.

With such a configuration, a small gap between the double high-density layers formed across the gasket in the thickness direction thereof is filled with the impermeable layer or an adhesive agent, so that it is possible to surely prevent slight leakage of fluid from occurring.

Preferably, the width of the overlap portion is varied depending on the distribution of tightening stress so that the width is increased as the tightening stress is larger.

With such a configuration, irrespective of the variation of tightening stresses which are inevitably caused, for example, between the peripheral portion of a bolt hole and a portion positioned away from the bolt hole, the tightening stress over the entire area of the gasket is substantially uniformly distributed. Thus, it is possible to suppress the occurrence of leakage caused by the variation of stress distribution. This is effective especially in the cases of gaskets having different shapes such as an oval shape (an oblong shape), and an ellipse shape in which the tightening stresses can be largely differed between respective portions.

As a material for forming the sheet-like base members in the sheet-like gaskets having the above-described configurations is selected from expanded graphite, porous PTFE, a beater sheet, a joint sheet, and a paper sheet.

Furthermore, the sheet-like gasket according to the invention is a sheet-like gasket formed of a material having a layered internal structure, wherein different materials are used for sheet-like base members which are adjacent in an inner and outer relationship among a plurality of divided sheet-like base members having an inner and outer relationship, an outer end portion and an inner end portion of the sheet-like base members are partially overlapped, and the gasket as a whole including the overlap portion is formed by pressurization to have a substantially uniform thickness.

According to the invention, as the materials for the inner and outer sheet-like base members in the sheet-like gasket in which an outer end portion and an inner end portion of the sheet-like base members which are adjacent in the inner and outer relationship are partially overlapped, and the gasket as a whole including the overlap portion is formed by pressurization to have a substantially uniform thickness, different materials each having a layered internal structure are used in combination. Thus, it is possible to obtain a sheet-like gasket which can attain various properties which are contrary to each other in the view point of materials and cannot be obtained by using a single material, such as contamination of fluid, heat resistance, adaptability of contact surfaces, and stress relaxation property, in addition to the above-mentioned superior sealing properties.

In the sheet-like gasket having the above-described configuration, it is desired that the sheet-like base members which are adjacent in the inner and outer relationship are formed of expanded graphite and porous PTFE, the porous PTFE sheet-like base member is disposed on the inner side, and the expanded graphite sheet-like base member is disposed on the outer side.

With such a configuration, since the sheet-like base material which is in contact with the fluid is formed of porous PTFE, the contamination of the fluid can be prevented, and airtightness, heat resistance, and stress relaxation properties which cannot be expected only by using porous PTFE can be attained.

Alternatively, a configuration in which the sheet-like base members which are adjacent in the inner and outer relationship are formed of expanded graphite and a paper sheet, the expanded graphite sheet-like base member is disposed on the inner side, and the paper sheet-like base member is disposed on the outer side, or a configuration in which a sheet-like base member made of a beater sheet or a joint sheet is disposed on both the inner and outer sides of a sheet-like base member of expanded graphite or porous PTFE as an intermediate portion may be used.

With the former configuration, sufficiently satisfactory airtightness can be ensured by the expanded graphite sheet-like base member, and in addition, the wear of the expanded graphite sheet-like base member by oxidation can be prevented by the paper sheet-like base member. Thus, the durability can be improved. With the latter configuration, sufficiently satisfactory airtightness can be ensured by the expanded graphite sheet-like base member. Moreover, high strength property and economic advantage which cannot be attained only by the expanded graphite sheet-like base member can be attained.

BRIEF DESCRIPTION OF THE DRAWINGS

FIG. 21 is a table showing property comparison among various materials used for a sheet-like base material.

FIG. 22 is a table of list for comparatively showing the characteristics of the sheet-like gaskets of the first to eighth embodiments of the invention and the prior art examples (A) to (E).

DESCRIPTION OF THE PREFERRED EMBODIMENTS

Figure 1:
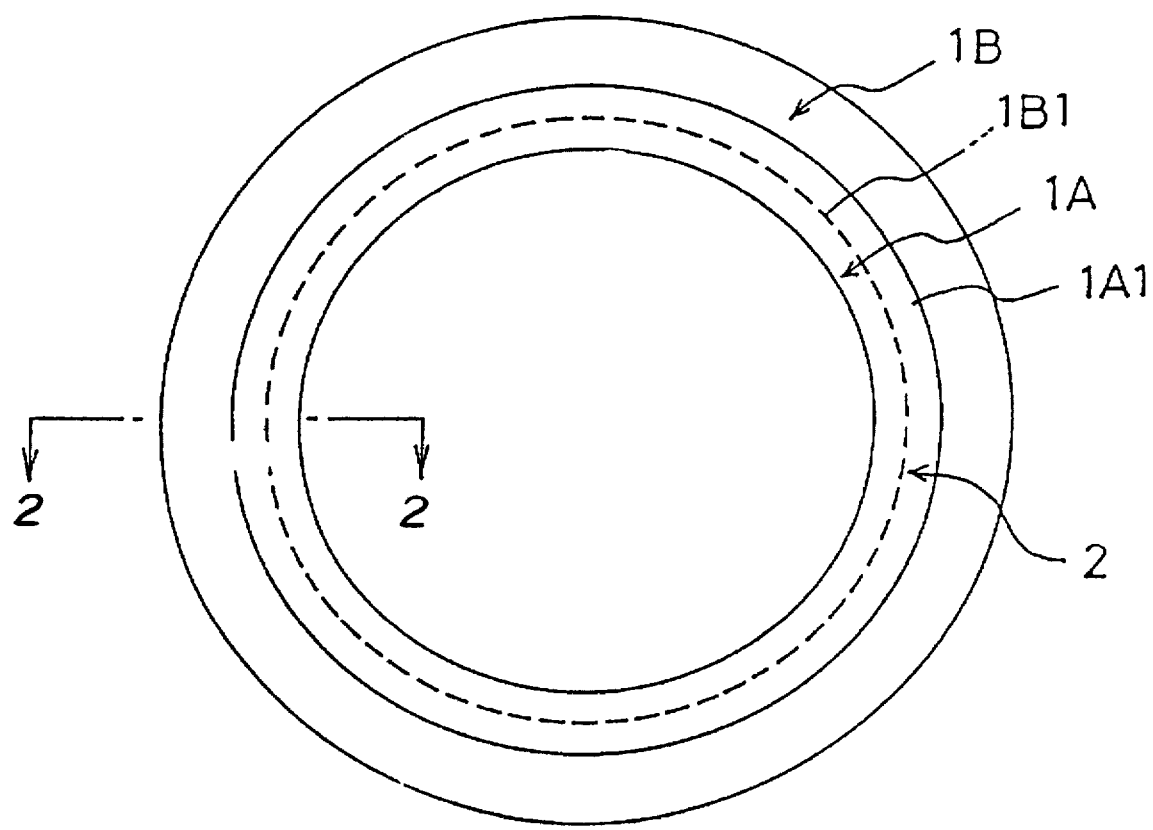
FIG. 1 is a plan view of a sheet-like gasket according to a first embodiment of the invention.
Figure 2:
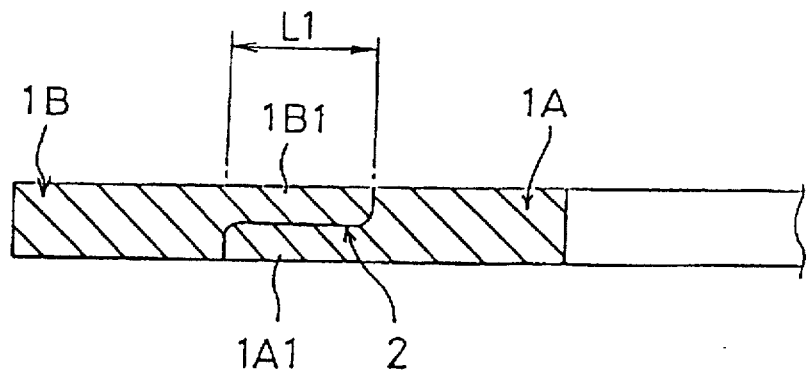
FIG. 2 is an enlarged half section view taken along a line A—A in FIG. 1.
Figure 3:
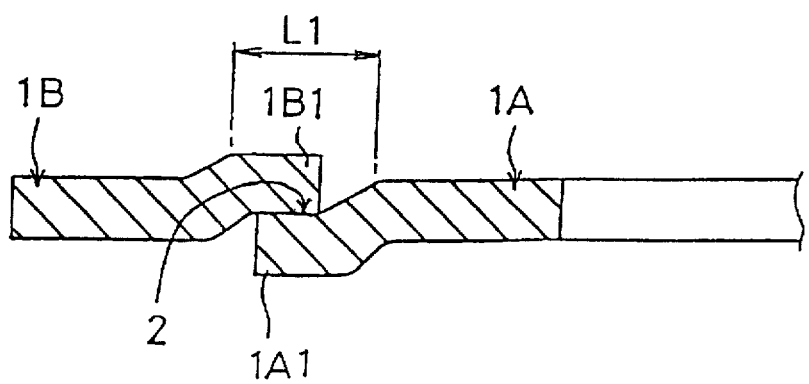
FIG. 3 is an enlarged half section view at a production stage prior to that shown in FIG. 2.

FIG. 1 is a plan view of a sheet-like gasket according to a first embodiment of the invention, and FIG. 2 is an enlarged half section view taken along a line A—A of FIG. 1. In FIGS. 1 and 2, 1A and 1B designate annular sheet-like base members which are formed in such a manner that expanded graphite is formed into a sheet-like shape by pressurization and then divided into two members having an inner and outer relationship. As shown in FIG. 3, an outer end portion 1A1 and an inner end portion 1B1 of these inner and outer sheet-like base members 1A and 1B are partially overlapped over a width L1. The whole gasket including the overlap portion 2 is formed by pressurization into a shape shown in FIG. 2 having a substantially uniform thickness.

Figure 4:
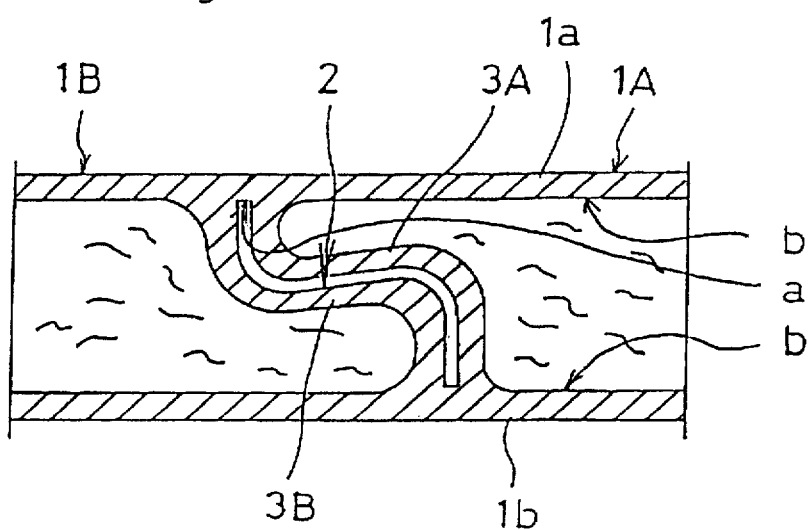
FIG. 4 is an enlarged cross-section view of main portions of FIG. 2 for illustrating penetration leakage preventing condition of the sheet-like gasket of the first embodiment.

In the sheet-like gasket having the above-described configuration, the overlap portion 2 of the inner and outer sheet-like base members 1A and 1B has a cross-sectional structure shown in FIG. 4. Specifically, both front and back faces 1a and 1b of the sheet-like base members 1A and 1B are in a high-density and high-alignment state over the entire area in inner and outer directions thereof. In the overlap portion 2, high-density layers 3A and 3B formed across the overlap portion 2 in a thickness direction thereof in a step-like manner, are partially formed in a double manner. Due to the presence of the double high-density layers 3A and 3B, penetration leakage via an internal layer of the inner sheet-like base member 1A to an internal layer of the outer sheet-like base member 1B, and to the outside thereof can be cut off. Even if the penetration leakage partly reaches the front and back face portions of the sheet-like gasket through the high-density layer 3A in the inner sheet-like base member 1A and through a small gap formed between the high-density layer 3B in the outer sheet-like base member 1B, the small amount of leakage can be cut off in the front and back face portions because the front and back face portions are continuous in the high-density and high-alignment state. In addition, the front and back face portions of the whole gasket are in the high-density and high-alignment state over the entire area in the inward and outward directions, so that it is possible to prevent also contact-surface leakage from occurring. As a result, the sheet-like gasket can attain high sealing properties as a whole.

Figure 5:
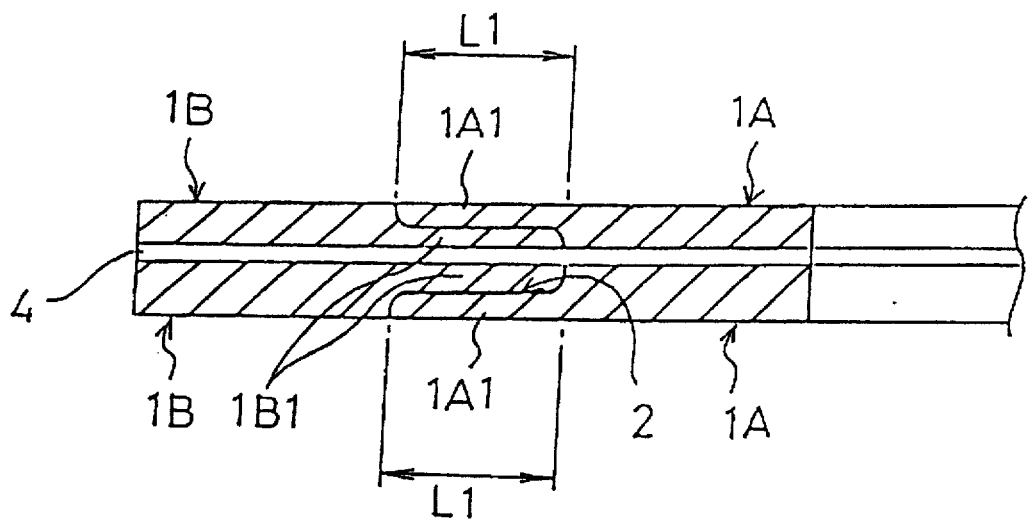
FIG. 5 is an enlarged half section view of a sheet-like gasket according to a second embodiment of the invention.
Figure 6:
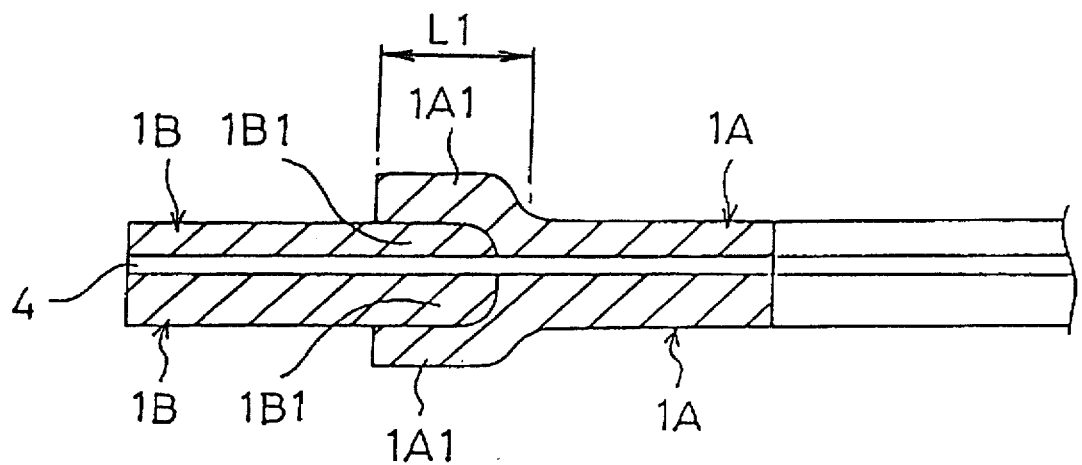
FIG. 6 is an enlarged half section view at a production stage prior to that shown in FIG. 5.

FIG. 5 is an enlarged half section view of a sheet-like gasket according to a second embodiment of the invention. In FIG. 5, 4 designates an annular reinforcing member made of metal foil such as stainless steel foil. On both front and back faces of the reinforcing member 4, annular sheet-like base members 1A and 1B made of expanded graphite which are two divided members having an inner and outer relationship are arranged via an adhesive agent prepared by mixing, for example, phenol with synthetic rubber (e.g., nitrile butadiene rubber: NBR), in such a manner that an outer end portion 1A1 and an inner end portion 1B1 thereof are partially overlapped over a width L1. Then, the whole gasket including the overlap portions 2 is formed by pressurization into a shape shown in FIG. 5 having a substantially uniform thickness.

In the sheet-like gasket of the second embodiment having the above-mentioned configuration, the total thickness is large. Slight leakage may occur from the contact surface of the reinforcing member 4. However, high-density layers 3A and 3B formed across each of the front and back overlap portions 2 in a thickness direction thereof in a step-like manner are partially formed (see FIG. 4). Accordingly, the gasket can attain the same effect of preventing the penetration leakage as that of the first embodiment. Moreover, the breaking strength against an internal pressure is reinforced, so that the gasket is suitably used under high-pressure conditions.

Figure 7:
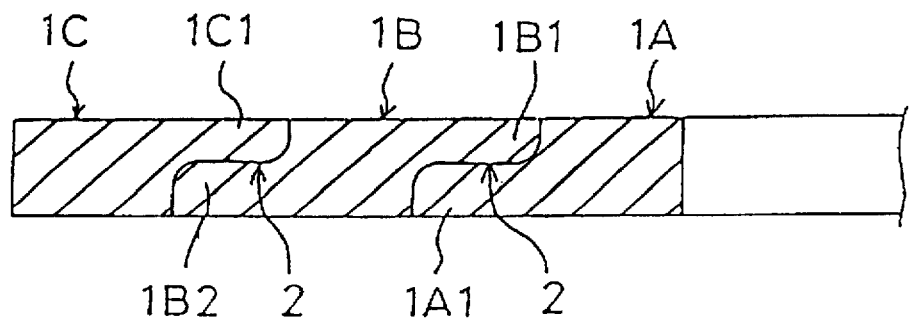
FIG. 7 is an enlarged half section view of a sheet-like gasket according to a third embodiment of the invention.
Figure 8:
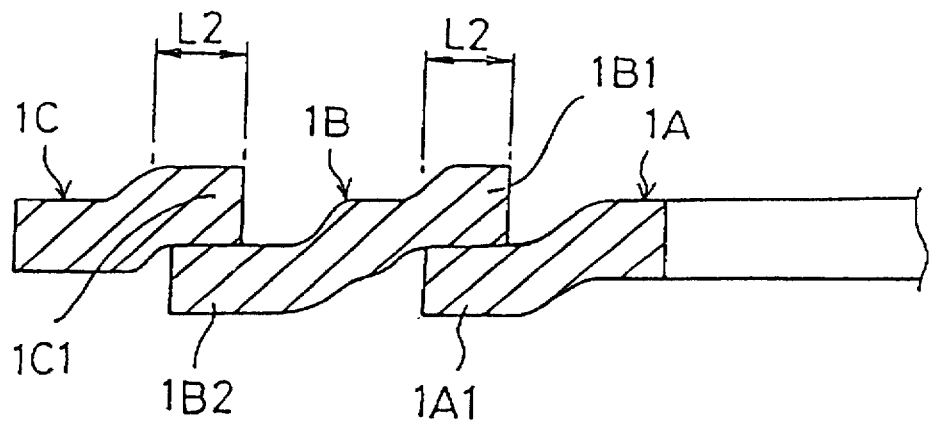
FIG. 8 is an enlarged half section view at a production stage prior to that shown in FIG. 7.

FIG. 7 is an enlarged half section view of a sheet-like gasket according to a third embodiment of the invention. In the gasket, annular sheet-like base members 1A, 1B, and 1C made of expanded graphite which are three divided members having an inner and outer relationship are used. An outer end portion 1A1 and an inner end portion 1B1 of the sheet-like base members 1A and 1B which are adjacent in the inner and outer relationship, and an outer end portion 1B2 and an inner end portion 1C1 of the sheet-like base members 1B and 1C are partially overlapped over a width L2 as shown in FIG. 8 (L2<L1). Between the overlap portions 2, an adhesive agent prepared by mixing, for example, phenol with synthetic rubber (e.g., NBR) is interposed. The whole gasket including the overlap portions 2 is formed by pressurization into a shape shown in FIG. 7 having a substantially uniform thickness, so that the sheet-like base members 1A, 1B, and 1C are formed into an integral part. In the sheet-like gasket of the third embodiment, high-density layers 3A and 3B, and 3B and 3C formed across the overlap portions in the thickness direction thereof (see FIG. 4, but the high-density layer 3C is not shown in FIG. 4), and an adhesive agent layer are formed in each of the two inner and outer overlap portions 2. Moreover, the penetration passages between the respective layers of the sheet-like base members 1A, 1B, and 1C from the inside to the outside are complicated, so that the contact-surface leakage and also the penetration leakage can be effectively prevented. Thus, the sealing properties can be further improved.

Figure 9:
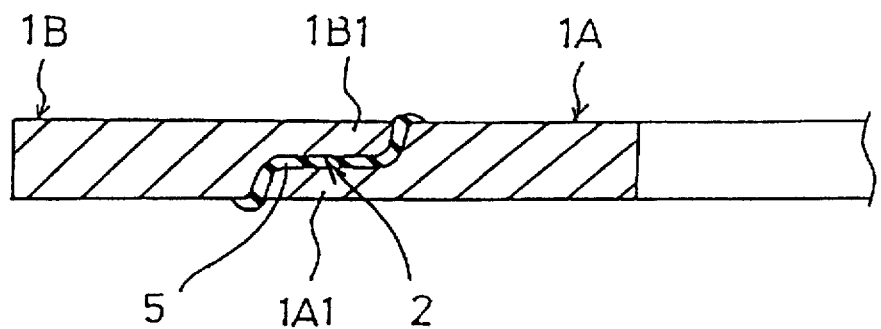
FIG. 9 is an enlarged half section view of a sheet-like gasket according to a fourth embodiment of the invention.
Figure 10:
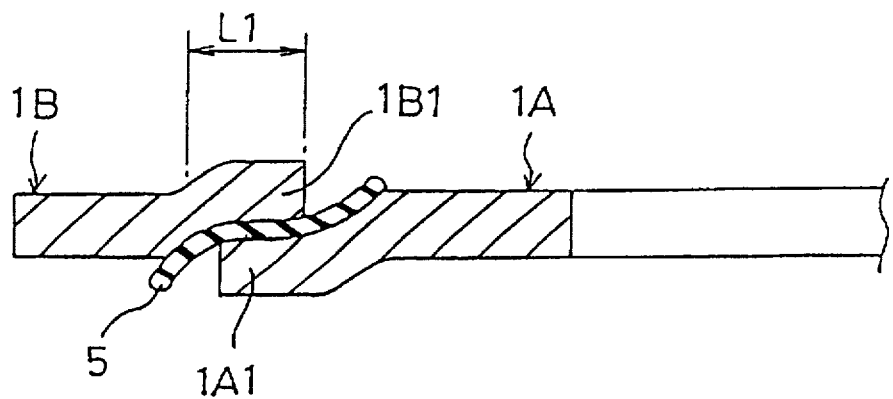
FIG. 10 is an enlarged half section view at a production stage prior to that shown in FIG. 9.

FIG. 9 is an enlarged half section view of a sheet-like gasket according to a fourth embodiment of the invention. In the same way as the first embodiment described above, an outer end portion 1A1 and an inner end portion 1B1 of annular sheet-like base member 1A and 1B made of expanded graphite which are two divided members having an inner and outer relationship are partially overlapped over a width L1, as shown in FIG. 10. On the overlap portion, synthetic rubber, a sealant, or the like is applied so as to form an impermeable layer 5. The whole gasket including the overlap portion 2 is formed by pressurization into a shape shown in FIG. 9 having a substantially uniform thickness. In the sheet-like gasket of the fourth embodiment, high-density layers 3A and 3B (see FIG. 4) are formed across the overlap portion 2 in a thickness direction thereof. A small gap between the high-density layers 3A and 3B is filled with the impermeable layer 5, so that it is possible to surely prevent slight leakage of fluid from occurring.

Figure 11:
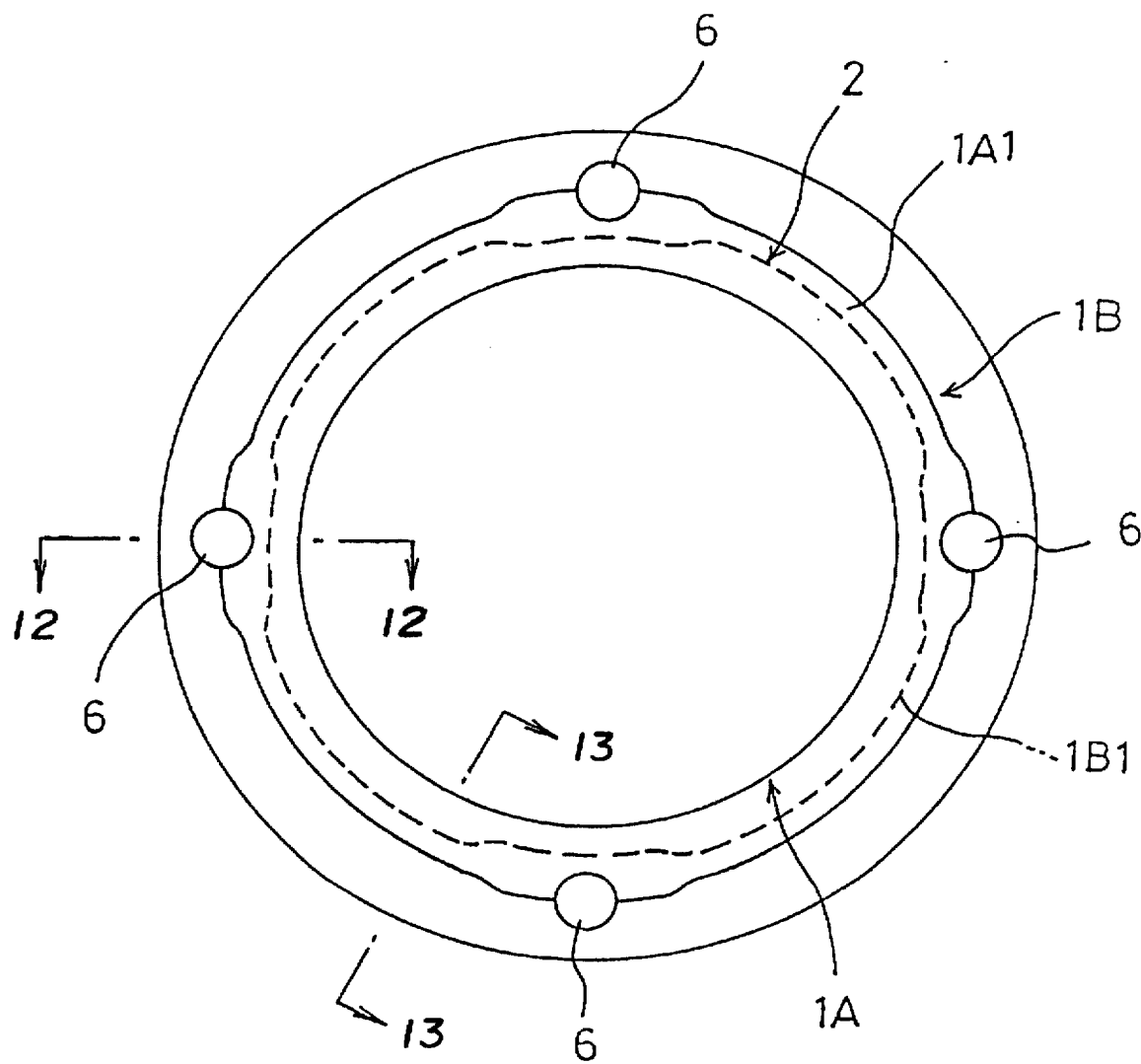
FIG. 11 is a plan view of a sheet-like gasket according to a fifth embodiment of the invention.
Figure 12:
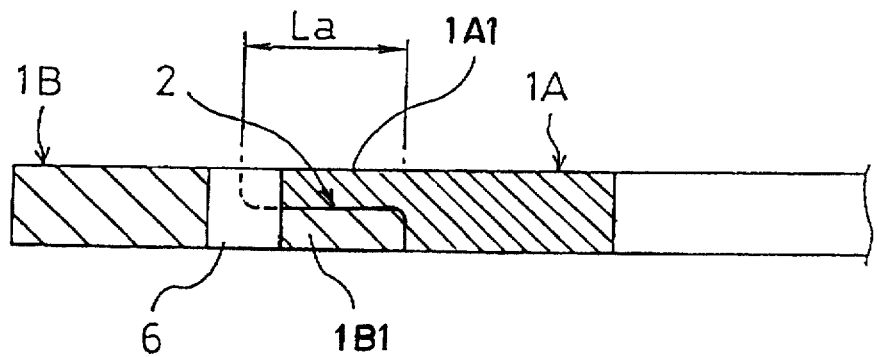
FIG. 12 is an enlarged half section view taken along a line B—B in FIG. 11.
Figure 13:
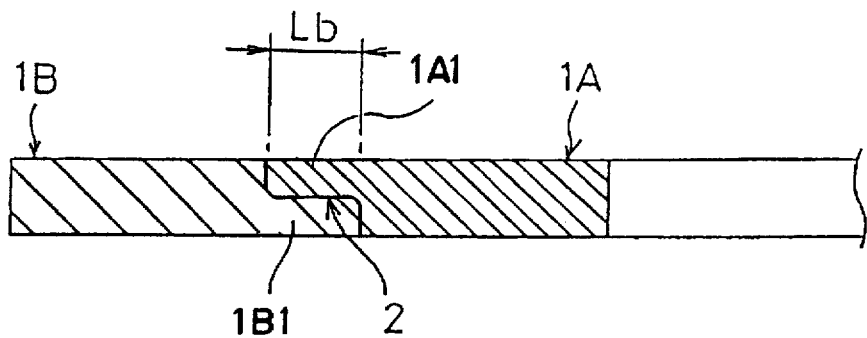
FIG. 13 is an enlarged half section view taken along a line C—C in FIG. 11.

FIG. 11 is a plan view of a sheet-like gasket according to a fifth embodiment of the invention, and FIGS. 12 and 13 are enlarged half section views taken along lines B—B and C—C in FIG. 11. In the same way as the first embodiment described above, an outer end portion 1A1 and an inner end portion 1B1 of annular sheet-like base members 1A and 1B made of expanded graphite which are two divided members having an inner and outer relationship are overlapped. The whole gasket including the overlap portion 2 is formed by pressurization so as to have a substantially uniform thickness. Also, a plurality of tightening bolt holes 6 which are located with intervals in a circumferential direction are formed (in the figure, four holes are shown). Herein, the width of the overlap portion 2 is varied depending on the distribution of tightening stress, in such a manner that the width is increased as the tightening stress is larger. Specifically, a width La in peripheral portions of the bolt holes 6 in which a large tightening stress is caused is increased (see FIG. 12), and a width Lb in a portion which is positioned away from the bolt holes 6 and in which a small tightening stress is caused is decreased (see FIG. 13).

In the case where the sheet-like gasket of the fifth embodiment having the above-described configuration is, for example, used for sealing flange connection portion of a pipe joint, when opposite joint flanges are connected to each other by tightening bolts, it is possible to uniformly distribute the tightening stress over the entire area of the gasket, irrespective of the variation of tightening stresses which is inevitably caused between the peripheral portion of the bolt hole 6 and a portion positioned away from the bolt hole 6. Thus, it is possible to effectively suppress leakage caused by the variation of stress distribution.

Figure 14:
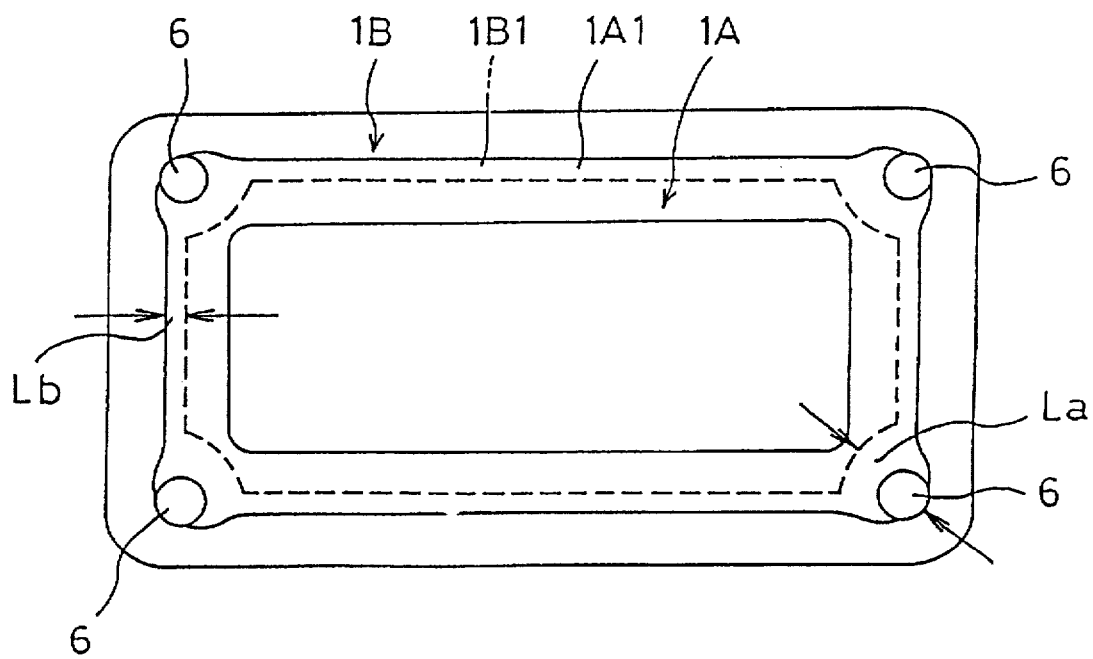
FIG. 14 is a plan view of a sheet-like gasket according to a sixth embodiment of the invention.

FIG. 14 is a plan view of a sheet-like gasket according to a sixth embodiment of the invention. In the sixth embodiment, inner and outer sheet-like base members 1A and 1B made of expanded graphite are rectangular. The width of an overlap portion 2 of the rectangular expanded graphite sheet-like base members 1A and 1B is varied in the same manner as that in the fifth embodiment, in such a manner that a width La in peripheral portions of the bolt holes 6 in which a large tightening stress is caused is increased (see FIG. 12), and a width Lb in a portion which is positioned away from the bolt holes 6 in which a small tightening stress is caused is decreased (see FIG. 13), so that the whole gasket has a rectangular shape. Instead of the rectangular shape, for example, an oval shape (an oblong shape) or an ellipse shape can be used. The width of the overlap portion 2 of such a gasket having a different shape in which tightening stresses are largely differed between respective portions depending on the service conditions is varied depending on the distribution of tightening stress in such a manner that the width is increased as the tightening stress is larger, in the same way as the fifth and sixth embodiments. As a result, leakage caused by the variation of stress distribution can be effectively suppressed.

In the sheet-like gaskets of the fifth and sixth embodiments, if the aforementioned adhesive agent is interposed in the overlap portion 2, the penetration leakage preventing effect can be further improved. Alternatively, if a reinforcing member such as stainless steel foil is interposed between layers or disposed on a surface, the breaking strength can be further reinforced. However, the adhesive agent and the reinforcing member are not necessarily required.

Figure 15:
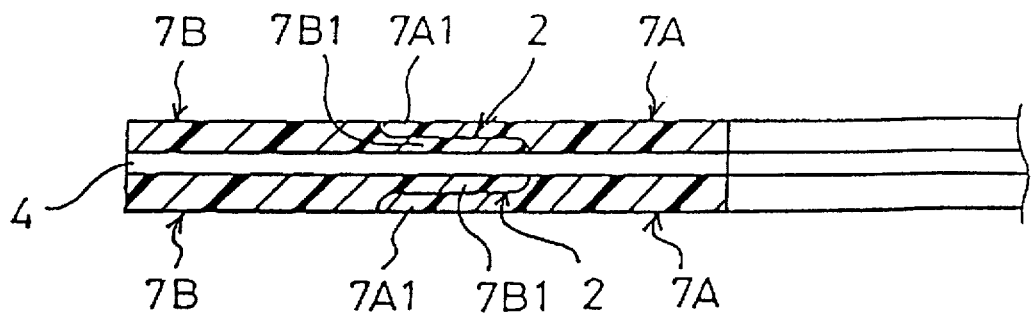
FIG. 15 is an enlarged half section view of a sheet-like gasket of a seventh embodiment of the invention.
Figure 16:
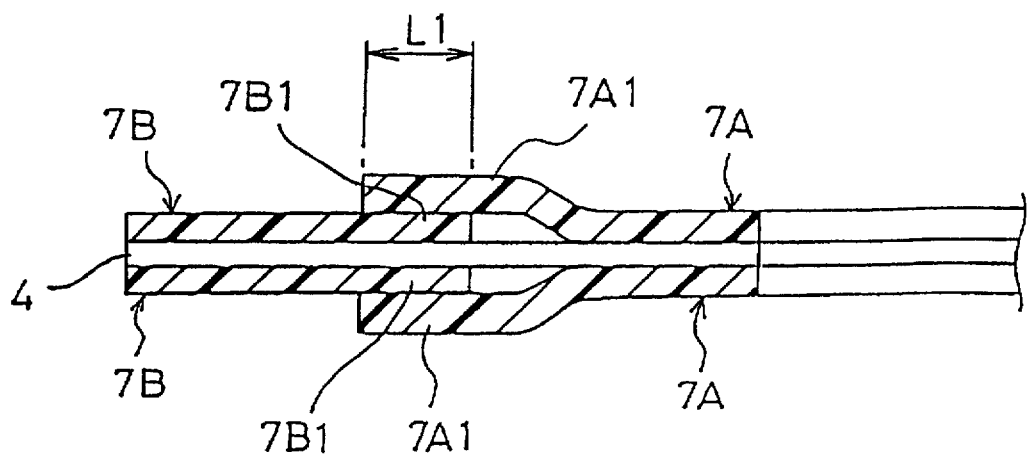
FIG. 16 is an enlarged half section view at a production stage prior to that shown in FIG. 15.

FIG. 15 is an enlarged half section view of a sheet-like gasket according to a seventh embodiment of the invention. In the figure, 4 designates an annular reinforcing member made of metal foil such as stainless steel foil. On front and back faces of the reinforcing member 4, annular sheet-like base members 7A and 7B made of porous PTFE which are two divided members having an inner and outer relationship are arranged via an adhesive agent prepared by mixing, for example, phenol with synthetic rubber (e.g., NBR), in such a manner that an outer end portion 7A1 and an inner end portion 7B1 thereof are partially overlapped over a width L1, as shown in FIG. 16. The whole gasket including the overlap portions 2 is formed by pressurization into a shape shown in FIG. 15 having a substantially uniform thickness. That is, the seventh embodiment has the same cross-sectional structure as that of the second embodiment, but is different in that porous PTFE is used as the material for the sheet-like base member, instead of expanded graphite.

In the sheet-like gasket according to the seventh embodiment having the above-mentioned configuration, by using the sheet-like base members 7A and 7B made of porous PTFE, the production cost is increased as compared with the case of the expanded graphite base members, and somewhat inferior in stress relaxation property and heat resistance. However, the sheet-like gasket has a smaller modulus, and is superior in adaptability to a flange face and the like, so that contact-surface leakage can be further reduced. Moreover, unlike expanded graphite, contamination of fluid by graphite particles which are peeled off by fluid does not occur. Thus, the superior effect of preventing fluid contamination can be attained.

Figure 17:
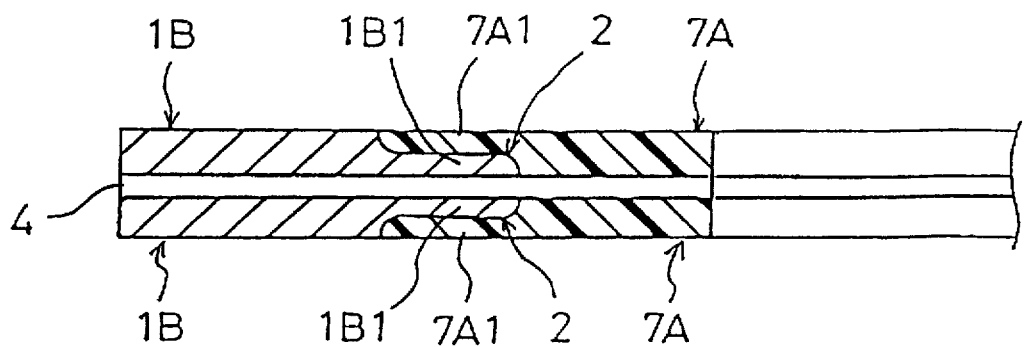
FIG. 17 is an enlarged half section view of a sheet-like gasket according to an eighth embodiment of the invention.

Embodiments shown in FIG. 17 and the subsequent figures show sheet-like gaskets in which a plurality of sheet-like base members having an inner and outer relationship are configured in a combination of different materials, and, in the same way as the embodiments described above, an overlap portion 2 is formed, and the whole gasket including the overlap portion 2 is formed by pressurization so as to have a substantially uniform thickness.

Figure 18:
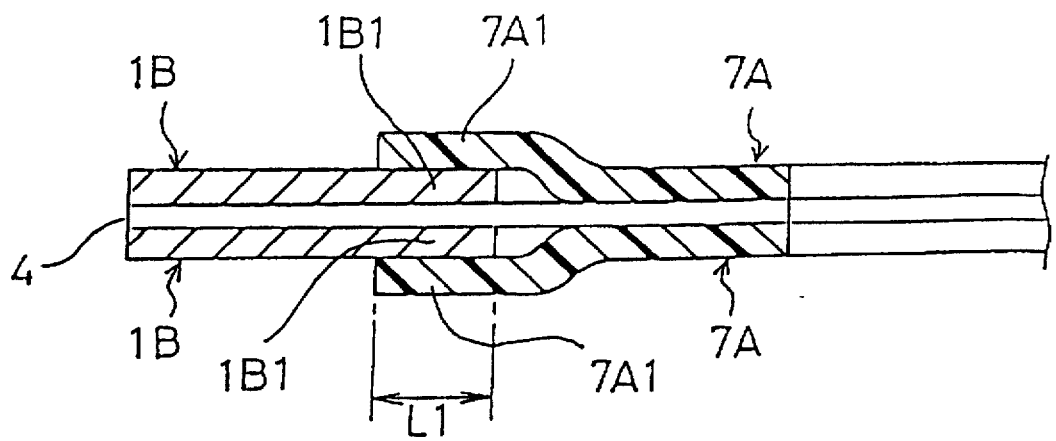
FIG. 18 is an enlarged half section view at a production stage prior to that shown in FIG. 17.

FIG. 17 is an enlarged half section view of a sheet-like gasket according to an eighth embodiment of the invention. On front and back faces of an annular reinforcing member 4 made of metal foil such as stainless steel foil, a sheet-like base member 7A made of porous PTFE and a sheet-like base member 1B made of expanded graphite are adjacently arranged in an inner and outer relationship, via an adhesive agent prepared by mixing, for example, phenol with synthetic rubber (e.g., NBR). An outer end portion 7A1 of the inner sheet-like base member 7A of porous PTFE and an inner end portion 1B1 of the outer sheet-like base member 1B of expanded graphite are partially overlapped over a width L1, as shown in FIG. 18. The whole gasket including the overlap portions 2 is formed into a shape shown in FIG. 17 having a substantially uniform thickness.

According to the sheet-like gasket of the eighth embodiment having the above-described configuration, the inner sheet-like base member 7A which is in contact with the fluid is made of porous PTFE, so that the contamination of fluid can be prevented. Also, by the combination with the sheet-like base member 1B of expanded graphite, airtightness, heat resistance, and stress relaxation properties which cannot be expected only by using porous PTFE can be applied.

In the cases where porous PTFE is used as in the above-mentioned seventh and eighth embodiments, a sheet-like base member which is obtained by stacking porous PTFE sheets having a thickness of about 100 µm so as to have a predetermined thickness may be used.

Figure 19:
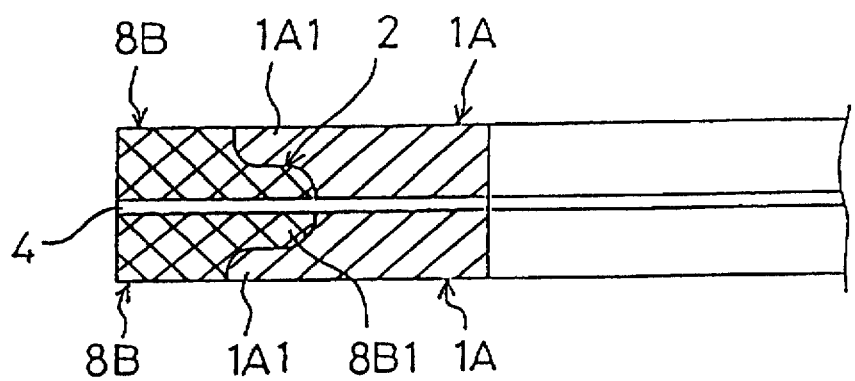
FIG. 19 is an enlarged half section view of a sheet-like gasket according to a ninth embodiment of the invention.

FIG. 19 is an enlarged half section view of a sheet-like gasket according to a ninth embodiment of the invention. On front and back faces of an annular reinforcing member 4 made of metal foil such as stainless steel foil, a sheet-like base member 1A made of expanded graphite and a paper sheet (inorganic fiber sheet) 8B are adjacently arranged in an inner and outer relationship, via an adhesive agent prepared by mixing, for example, phenol with synthetic rubber (e.g., NBR). An outer end portion 1A1 of the inner sheet-like base member 1A made of expanded graphite, and an inner end portion 8B1 of the outer sheet-like base member 8B made of a paper sheet are partially overlapped over a width L1. The whole gasket including the overlap portions 2 is formed by pressurization into a shape shown in FIG. 19 having a substantially uniform thickness.

According to the sheet-like gasket of the ninth embodiment having the above-described configuration, properties such as stress relaxation property and heat resistance which are attained by both expanded graphite and a paper sheet, and airtightness which is attained by expanded graphite are sufficiently ensured. In addition, by the combination with the paper sheet which has economical advantage, the cost of the whole gasket as a whole can be reduced as much as possible. Wear of expanded graphite by oxidation can be prevented by the outer sheet-like base member 8B of a paper sheet, so that the durability of the gasket can be improved.

Figure 20:
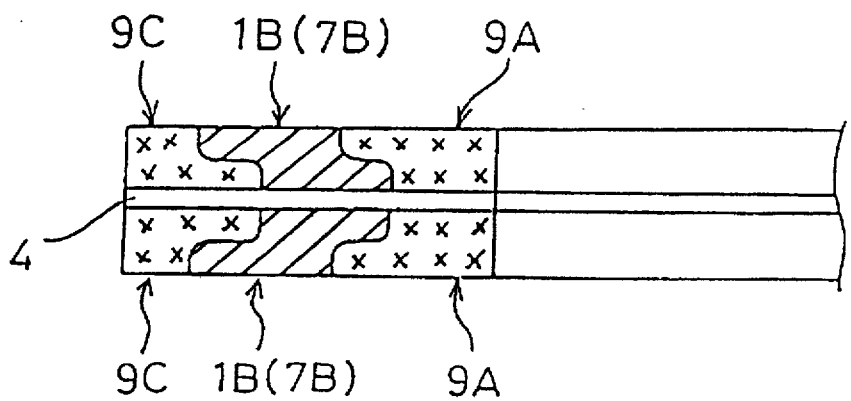
FIG. 20 is an enlarged half section view of a sheet-like gasket according to a tenth embodiment of the invention.

FIG. 20 is an enlarged half section view of a sheet-like gasket according to a tenth embodiment of the invention. On front and back faces of an annular reinforcing member 4 of metal foil such as stainless steel foil, a sheet-like base member 1B made of expanded graphite or a sheet-like base member 7B made of porous PTFE is disposed in an intermediate portion in an inner and outer relationship, via an adhesive agent prepared by mixing, for example, phenol with synthetic rubber (e.g., NBR). On the inside and outside thereof, sheet-like base members 9A and 9C made of a beater sheet or a joint sheet are arranged, and end portions which are adjacent in the inner and outer relationship are overlapped over a width L2. The whole gasket including the overlap portions 2 and 2 is formed by pressurization into a shape shown in FIG. 20 having a substantially uniform thickness.

According to the sheet-like gasket of the tenth embodiment having the above-described configuration, by disposing the sheet-like base member 1B (7B) of expanded graphite or porous PTFE in the intermediate portion, sufficiently satisfactory airtightness can be ensured. Moreover, by the inner and outer sheet-like base members 9A and 9C made of a beater sheet or a joint sheet, high strength property and economic advantage which cannot be attained by expanded graphite and porous PTFE can be applied.

The above-described eighth to tenth embodiments show examples of sheet-like gaskets in which a plurality of sheet-like base members having the inner and outer relationship are configured by a combination of different materials. In addition to the above-described embodiments, various different materials can be combined in accordance with applications and service conditions, so that properties which are contrary to each other and which cannot be attained by a single material can be applied. FIG. 21 is a table showing a comparison of properties of various materials suitable for forming such sheet-like base members. In the figure, ⊚ indicates the best property, ○ indicates a good property, ∆ indicates a slightly inferior property, and x indicates an inferior property.

The above-described eighth to tenth embodiments show sheet-like gaskets in which the reinforcing member 4 made of metal foil such as stainless steel foil is interposed in a thicker intermediate portion, so as to improve the breaking strength. Alternatively, a configuration in which the reinforcing member is not disposed may be employed.

FIG. 22 is an at-a-glance table comparatively showing properties of strength, heat resistance, and leakage amount among the properties of the sheet-like gaskets of the first to eighth embodiments in the above-described embodiments of the invention, and the sheet-like gaskets of the prior art examples (A) to (E). In the figure, ⊚ indicates a very good property, ○ indicates a good property, and Δ indicates a slightly inferior property. The leakage amount is indicated by a value obtained by using a measurement method (described below) as shown in FIG. 23, and the measurement unit is atm·cc/min.

Figure 23:
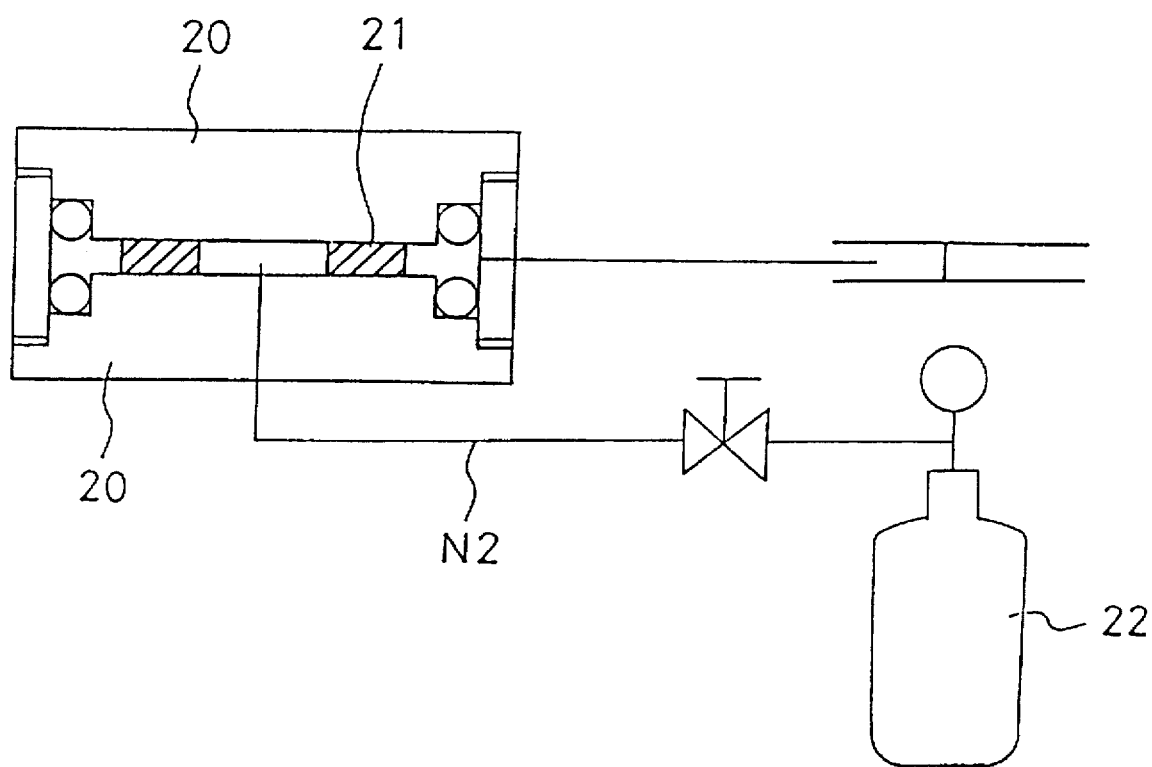
FIG. 23 is a schematic view of a configuration of an apparatus used for measuring an amount of leakage.
Figure 24:
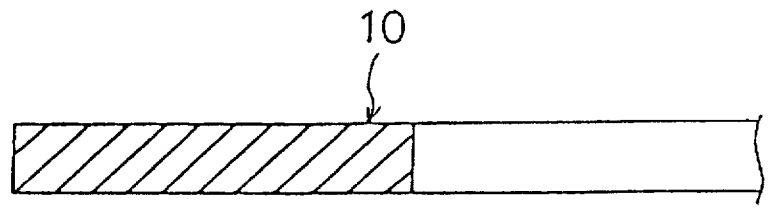
FIG. 24 is an enlarged half section view showing the example (A) of a prior art sheet-like gasket.
Figure 25:
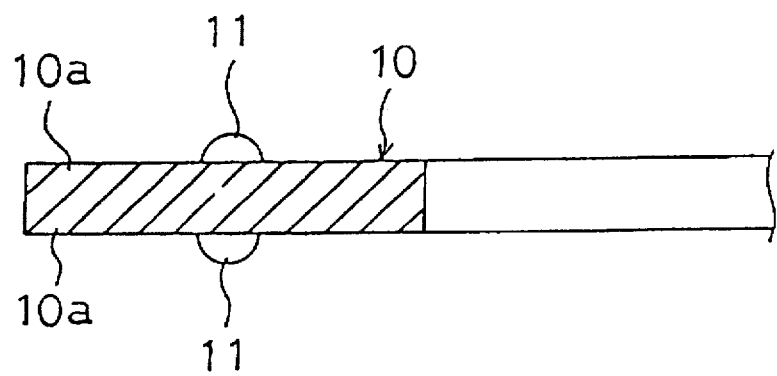
FIG. 25 is an enlarged half section view showing the example (B) of a prior art sheet-like gasket.
Figure 26:
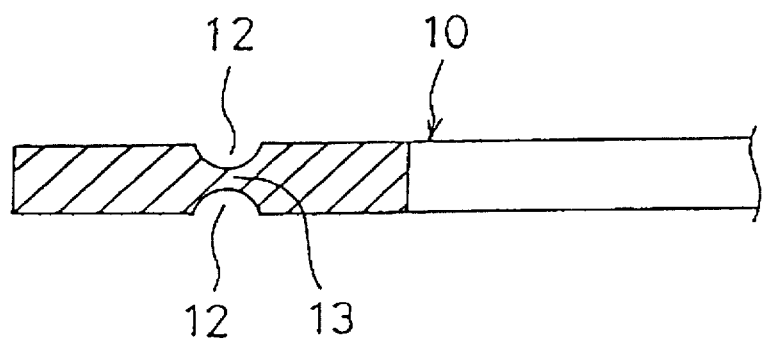
FIG. 26 is an enlarged half section view showing the example (C) of a prior art sheet-like gasket.
Figure 27:
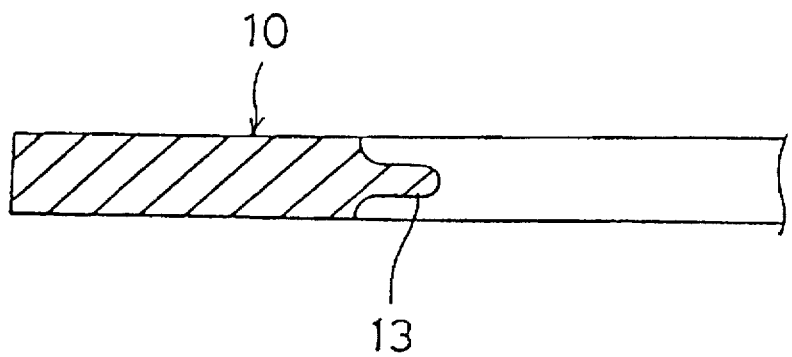
FIG. 27 is an enlarged half section view showing the example (D) of a prior art sheet-like gasket.
Figure 28:
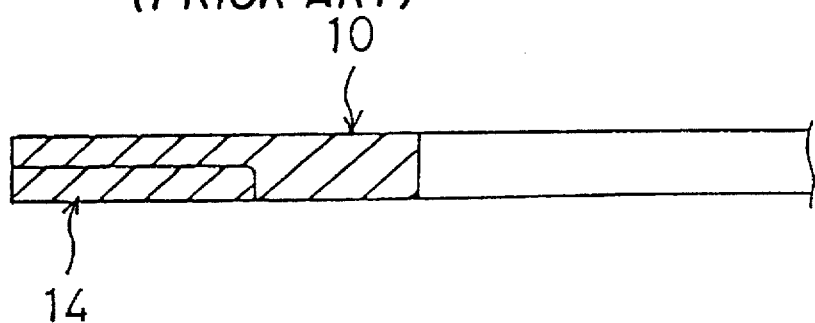
FIG. 28 is an enlarged half section view showing the example (E) of a prior art sheet-like gasket.
Figure 29:
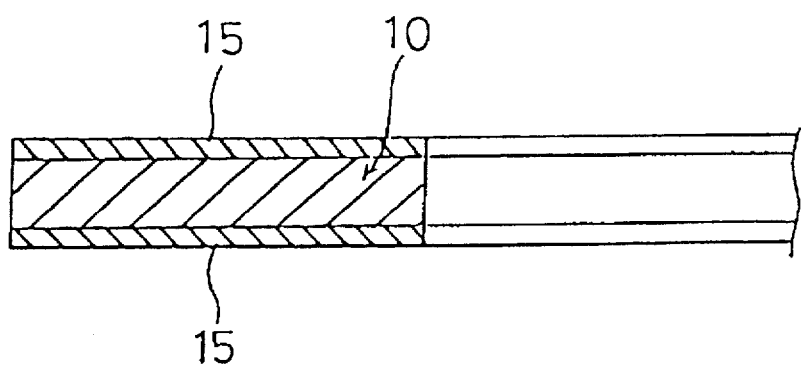
FIG. 29 is an enlarged half section view showing one configuration of the example (F) of a prior art sheet-like gasket.
Figure 30:
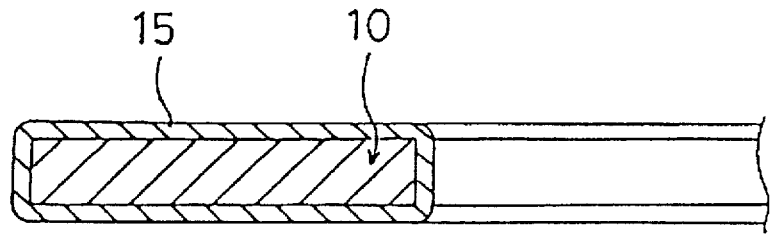
FIG. 30 is an enlarged half section view showing another configuration of the example (F) of a prior art sheet-like gasket.
Figure 31:
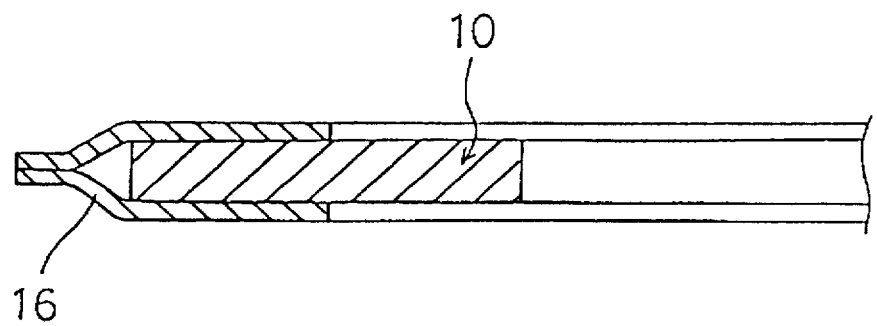
FIG. 31 is an enlarged half section view showing the example (G) of a prior art sheet-like gasket.
Figure 32:
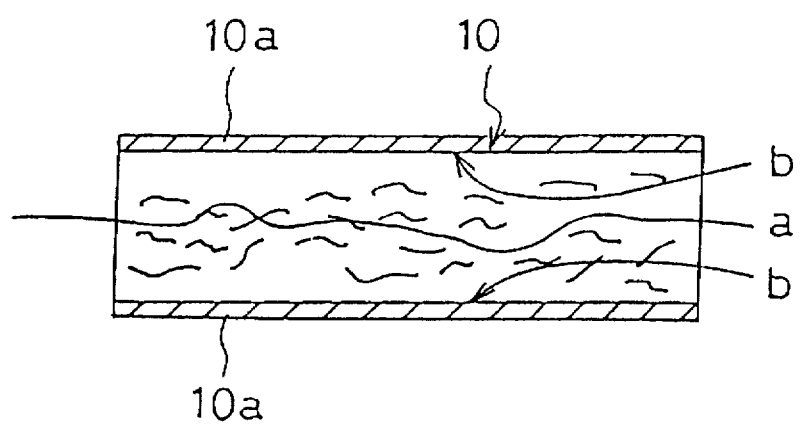
FIG. 32 is an enlarged cross-section view of main portions for illustrating penetration leakage occurrence condition in a prior art sheet-like gasket.

In FIG. 23, 20 and 20 indicate a pair of clamping members. The pair of clamping members 20 and 20 clamped a gasket sample 21 having an outer diameter of 114 mm, an inner diameter of 87 mm, and a thickness of 1.5 mm. Compression force was applied by a hydraulic pressing machine which is not shown in the figure, and a tightening face pressure of 40 Mpa was applied. Thereafter, a nitrogen gas filled in a nitrogen gas cylinder 22 was injected into the inside of the gasket sample so that the internal pressure reached 2.059 Mpa. This condition was held for five minutes, and leakage to the outer circumferential side of the gasket sample 21 was collected. Then, the leakage amount was observed and measured by soap film passing through a tube.

As is apparent from the property comparison result shown in FIG. 22, the leakage amounts of the sheet-like gaskets of the embodiments of the invention are smaller than those of the prior art examples by one or more orders. This means that the sealing properties are remarkably improved.

According to the invention, an outer end portion and an inner end portion of the sheet-like base members which are adjacent in the inner and outer relationship are partially overlapped. The whole gasket including the overlap portion is formed by pressurization so as to have a substantially uniform thickness. As a result, double high-density layers in the thickness direction thereof are partially formed in a direction crossing the overlap portion of the sheet-like base members. Due to the presence of the double high-density layers, penetration leakage via an internal layer of the sheet-like base member to the outside thereof can be cut off. In addition, the front and back face portions of the whole gasket are in a high-density and high-alignment state over an entire area in the inward and outward directions, so that contact-surface leakage is prevented from occurring. Thus, the gasket of the invention can achieve an effect of attaining very high sealing properties as a whole.

In the sheet-like gasket having the above-mentioned configuration, when a continuous single-piece reinforcing member is provided over an intermediate portion between layers or on a surface of the sheet-like base members, the breaking strength against an internal pressure can be reinforced, so that it is possible to obtain a gasket which can be suitably used under high-pressure conditions.

In the above-described sheet-like gasket, when an impermeable layer is formed on the overlap portion, or when, in the overlap portion, the sheet-like base members which are adjacent in the inner and outer relationship are bonded to each other, small gaps between the double high-density layers formed across the gasket in the thickness direction thereof is filled with the impermeable layer or the adhesive agent, so that it is possible to surely prevent slight leakage of fluid from occurring. Thus, the sealing properties can be further improved.

In the case where, in the above-mentioned sheet-like gasket, a width of the overlap portion is varied depending on the distribution of tightening stress so that the width is increased as the tightening stress is larger, the tightening stress over an entire area of the gasket can be substantially uniformly distributed, irrespective of the variation of tightening stresses which is inevitably caused, for example, between the peripheral portion of a bolt hole and a portion positioned away from the bolt hole. Thus, it is possible to suppress the occurrence of leakage caused by the variation of stress distribution. If this configuration is applied to gaskets having different shapes such as an oval shape, and an ellipse shape in which the tightening stresses can be largely differed between portions, the effects can be more effectively attained.

According to the invention, as the materials for the inner and outer sheet-like base members in the sheet-like gasket in which an outer end portion and an inner end portion of the sheet-like base members which are adjacent in the inner and outer relationship are partially overlapped, and the gasket as a whole including the overlap portion is formed by pressurization to have a substantially uniform thickness, different materials are used in combination. Thus, it is possible to obtain a sheet-like gasket which can attain various properties which are contrary to each other in the view point of materials and cannot be obtained by using a single material, such as contamination of fluid, heat resistance, adaptability of contact surfaces, and stress relaxation property, in addition to the above-mentioned superior sealing properties.

Particularly, in the case where expanded graphite and porous PTFE are used as the combination of different kinds of materials, and the porous PTFE sheet-like base member is disposed on an inner side, and the expanded graphite sheet-like base member is disposed on an outer side, since the sheet-like base material which is in contact with the fluid is formed of porous PTFE, the contamination of the fluid can be prevented, and airtightness, heat resistance, and stress relaxation properties which cannot be expected only by using porous PTFE can be applied.

In the case where expanded graphite and a paper sheet are used as the combination of different kinds of materials, and the expanded graphite sheet-like base member is disposed on an inner side, and the paper sheet sheet-like base member is disposed on an outer side, sufficiently satisfactory airtightness can be ensured by the expanded graphite sheet-like base member, and in addition, the wear of expanded graphite sheet-like base member by oxidation can be prevented by the paper sheet sheet-like base member. Thus, the durability can be improved. In the case where a sheet-like base member made of a beater sheet or a joint sheet is disposed on both inner and outer sides of a sheet-like base member of expanded graphite or porous PTFE as an intermediate portion, sufficiently satisfactory airtightness can be ensured by the expanded graphite sheet-like base member. Moreover, high strength property and economic advantage which cannot be attained only by the expanded graphite sheet-like base member can be applied.

We claim:

1. A sheet-like gasket formed of a material having a layered internal structure, comprising sheet-like base members, each including spaced apart high-density faces, and each being adjacent in an inner and outer relationship, wherein an outer peripheral portion of said inner base member and an inner peripheral portion of said outer base member are partially overlapped about said inner and outer peripheral portions, and wherein said gasket including said partially overlapped portion is formed by pressurization to have a substantially uniform thickness with said sheet-like base members being bonded to each other in said partially overlapped portion.

2. A sheet-like gasket according to claim 1, wherein a continuous single-piece reinforcing member extends along said plurality of sheet-like base members.

3. A sheet-like gasket according to claim 1, wherein an impermeable layer is formed on said partially overlapped portion.

4. A sheet-like gasket according to claim 1, wherein the width of said partially overlapped portion is dependent upon the tightening stress distribution and is increased as the tightening stress is larger.

5. A sheet-like gasket according to claim 1, wherein a material for forming said sheet-like base members is selected from the group consisting of expanded graphite, porous polytetrafluoroethylene, a beater sheet, and a paper sheet.

6. A sheet-like gasket according to claim 2, wherein a material for forming said sheet-like base members is selected from the group consisting of expanded graphite, porous polytetrafluoroethylene, a beater sheet, and a paper sheet.

7. A sheet-like gasket according to claim 2, wherein a material for forming said sheet-like base members is selected from the group consisting of expanded graphite, porous polytetrafluoroethylene, a beater sheet, and a paper sheet.

8. A sheet-like gasket formed of a material having a layered internal structure, comprising sheet-like base members of different materials, each including spaced apart high-density faces, and each being adjacent in an inner and outer relationship, wherein an outer peripheral portion of said inner base member and an inner peripheral portion of said outer base member are partially overlapped about said inner and outer peripheral portions, and wherein said gasket including said partially overlapped portion is formed by pressurization to have a substantially uniform thickness with said sheet-like base members being bonded to each other in said partially overlapped portion.

9. A sheet-like gasket according to claim 8, wherein said materials for said sheet-like base members are expanded graphite and porous polytetrafluoroethylene, with said porous polytetrafluoroethylene sheet-like base member being disposed on an inner side of said gasket, and said expanded graphite sheet-like base member being disposed on an outer side of said gasket.

10. A sheet-like gasket according to claim 8, wherein said materials for said sheet-like base members are expanded graphite and a paper sheet, with said expanded graphite sheet-like base member being disposed on an inner side of said gasket, and said paper sheet sheet-like base member being disposed on an outer side of said gasket.

11. A sheet-like gasket according to claim 8, wherein a sheet-like base member made of one of a beater sheet and a joint sheet is disposed on both the inner and outer sides of a sheet-like base member made of one of expanded graphite and porous polytetrafluoroethylene as an intermediate portion.

* * * * *

UNITED STATES PATENT AND TRADEMARK OFFICE
CERTIFICATE OF CORRECTION

PATENT NO. : 5,634,645
DATED : June 3, 1997
INVENTOR(S) : Masanori Seki et al

It is certified that error appears in the above-indentified patent and that said Letters Patent is hereby corrected as shown below:

Claim 7, column 13, line 15, "2" should be --3--.

Signed and Sealed this

Second Day of September, 1997

Attest:

BRUCE LEHMAN

*Attesting Officer*     *Commissioner of Patents and Trademarks*